United States Patent [19]

Sakurai et al.

[11] Patent Number: 5,740,768
[45] Date of Patent: Apr. 21, 1998

[54] ENGINE CAM SHAFT DRIVE ARRANGEMENT

[75] Inventors: Kenichi Sakurai; Tatsuo Niiyama; Masahiro Uchida, all of Iwata, Japan

[73] Assignee: Yamaha Hatsudoki Kubushiki Kaisha, Iwata, Japan

[21] Appl. No.: 684,244

[22] Filed: Jul. 19, 1996

[30] Foreign Application Priority Data

Jul. 31, 1995 [JP] Japan ........................... 7-195343

[51] Int. Cl.⁶ .................................. F02B 1/00; F01L 1/02
[52] U.S. Cl. ................................. 123/90.27; 123/90.31
[58] Field of Search ........................ 123/90.27, 90.31, 123/195 R, 198 R

[56] References Cited

U.S. PATENT DOCUMENTS

| | | | |
|---|---|---|---|
| 4,993,374 | 2/1991 | Okui | 123/90.31 |
| 5,099,945 | 3/1992 | Okui et al. | 123/90.31 |
| 5,154,144 | 10/1992 | Okui et al. | 123/90.31 |
| 5,184,582 | 2/1993 | Okui et al. | 123/90.31 |

*Primary Examiner*—Weilun Lo
*Attorney, Agent, or Firm*—Knobbe, Martens, Olson & Bear LLP

[57] ABSTRACT

A two-stage cam shaft drive arrangement for an internal combustion engine employing a pair of flexible transmitters. The two-stage mechanism is driven by an intermediate shaft that is driven off of the crankshaft at a point between its ends. Flexible transmitter tensioners are engaged with the flexible transmitters on the side away from the cylinder block for ease of accessibility and to maintain a more compact engine configuration.

13 Claims, 5 Drawing Sheets

ENGINE CAM SHAFT DRIVE ARRANGEMENT

BACKGROUND OF THE INVENTION

This invention relates to an internal combustion engine and more particularly to an improved and compact cam shaft drive arrangement for internal combustion engines.

In order to improve the performance and efficiency of four-cycle engines, the use of single or double overhead cam shafts (SOHC or DOHC) have been resorted to. As is well known, the engine cam shaft or shafts are generally driven at one-half crankshaft speed in order to provide the requisite timing events for the opening and closing of the intake and exhaust valves. Various types of cam shaft drive arrangements have been proposed for such engines. The type of drive most commonly utilized employs flexible transmitters such as chains or toothed belts.

One of the problems in conjunction with the cam shaft drive is that the two-to-one speed ratio requires generally the use of relatively large pulleys or sprockets on the cam shaft. Since the cam shafts are positioned at the upper end of the engine and their drives are normally located at one end of the engine, this results in a rather bulky engine configuration. This arrangement is particularly disadvantageous when the engine is mounted transversely in the engine compartment although many of these disadvantages also apply to more conventional fore and aft engine mounting.

In connection with the driving of the cam shafts, although various types of driving mechanisms have been proposed, as already noted, the use of flexible transmitters for the cam shaft drive is a preferred arrangement. The reason for the preference of flexible transmitters is that they generate less noise than gear drives. However, the use of such flexible transmitters generally requires positioning of the cam shaft drive at the end of the engine. In addition, it is the normal practice to also employ biased chain or belt tensioners for ensuring that the flexible transmitter does not become disengaged from the driving and driven sprockets.

A cam shaft drive arrangement for an engine that provides a number of advantages in a compact engine assembly is described in U.S. Pat. No. 5,154,144 of the same title, issued Oct. 13, 1992 in the names of Kaoru Okui and Manabu Kobayashi, which patent is assigned to the assignee hereof.

In that arrangement, the engine crankshaft drives an output shaft that is rotatable about a parallel axis to the crankshaft axis. This output shaft then drives a cam driving shaft through a first flexible transmitter and this cam driving shaft is journaled in the cylinder head at one side of it. The cam driving shaft, in turn, drives the cam shafts through a second flexible transmitter drive. By using the two-stage drive, it is possible to provide the step down in transmission ratio in two stages and thus smaller pulleys may be employed with the cam shafts and a more compact engine results. However, there are certain features in connection with such cam shaft drives that could be improved.

For example, in the arrangement shown in that patent, the transmitter tensioners are disposed on the inside of the engine and thus are somewhat less accessible than desirable. In addition, by positioning the tensioners on this side then the drive must be moved away from the engine for clearance reasons and the engine gains in bulk in transverse directions.

It is, therefore, a principal object of this invention to provide an improved cam shaft drive arrangement of the type generally employing an auxiliary driving shaft and a two-stage reduction between the crankshaft and the cam shaft.

It is a further object of this invention to provide an improved and compact cam shaft drive for an internal combustion engine.

It is a still further object of this invention to provide an improved tensioner arrangement for such cam shaft drives.

SUMMARY OF THE INVENTION

This invention is adapted to be embodied in an internal engine that is comprised of a cylinder block and a cylinder head which closes one end of the cylinder block. At least one overhead cam shaft is journaled for rotation about a first axis in the cylinder head for operating the valves therein. A crankcase closes the other end of the cylinder block and contains a crankshaft that is rotatable about a second axis which is parallel to the first axis. An intermediate shaft is journaled for rotation about a third axis that is parallel to the other axes and which is disposed on one side of the cylinder block. A drive arrangement drives the intermediate shaft from the crankshaft. A cam driving shaft is journaled for rotation at the one side of the cylinder block about a fourth axis that is spaced from the third axis, parallel to it and which is in proximity to the cylinder head. A first flexible transmitter transmission transmits drive from the intermediate shaft to the cam driving shaft and a second flexible transmitter transmits drive from the cam driving shaft to the cam shaft. At least one flexible transmitter tensioner is mounted for cooperation with one of the flexible transmitter transmissions and is engaged with the portion of the flexible transmitter that is disposed outwardly from the cylinder block.

DETAILED DESCRIPTION OF THE PREFERRED EMBODIMENTS

Figure 1:
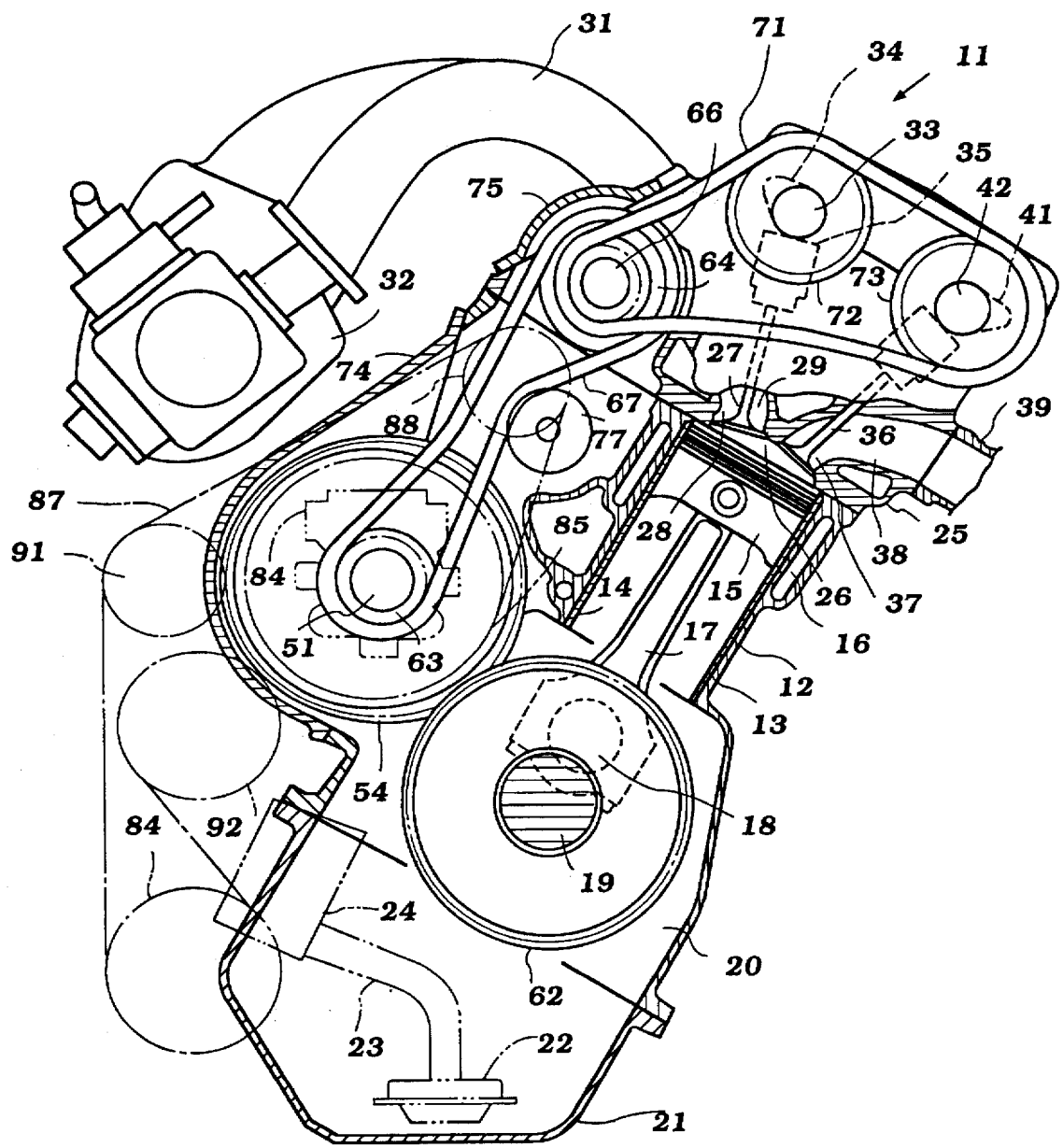
FIG. 1 is an end elevational view of an engine constructed in accordance with an embodiment of the invention with portions of the engine's outer surface removed to illustrate various internal components and the accessory drive arrangement for the engine which is shown partially in phantom.

Referring now to the drawings and initially to FIG. 1, an internal combustion engine constructed in accordance with an embodiment of the invention is indicated generally by the reference numeral 11. In the illustrated embodiment, the engine 11 is depicted as being of the five cylinder, in-line, four-stroke type though it is to be understood that the invention may also be practiced in conjunction with engines of other configurations. The engine 11 is configured so as to facilitate its use as a propulsion unit for motor vehicles such as an automobile. Particularly the engine 11 is configured for use in a transverse positioning in the engine compartment, although its use is not so limited. However the compact construction of the engine facilitates such applications even though the engine 11 is capable of having more cylinders than normally possible in such transverse engine orientations.

The engine 11 is comprised of a cylinder block 12 which may be formed of a lightweight material such as cast aluminum alloy and includes cylindrical openings in which are press-fitted or otherwise formed sleeves 13 that define cylinder bores 14 in which pistons 15 reciprocate. The cylinder bore axes define a plane that is inclined rearwardly from vertical. As such, the cylinder block 12 slants rearwardly in the illustrated engine compartment installation.

The engine 11 is water cooled. For this reason, a plurality of water jackets 16 are disposed adjacent to the cylinder bores 14 so as to cool the engine 11. The pistons 15 are pivotally connected to the small ends of respective connecting rods 17, whose big ends are rotatably journaled about the throw 18 of a crankshaft 19. The crankshaft 19 is rotatably journaled by any suitable means within a crankcase 20. The construction of the crankshaft 19 will be discussed in detail later.

The crankcase 20 is defined by the lower end of the cylinder block 12 and a lower crankcase member 21 which serves the oil pan for the engine 12 and is affixed to the cylinder block 12 by any suitable means. A strainer 22 is disposed within the lower end of the oil pan 21 and communicates through a conduit 23 with an oil pump 24 which pumps lubricating oil throughout the engine 11, as is well known in the art.

A cylinder head is indicated by the reference numeral 25 and is affixed to the top of the cylinder block 12 in a known manner. The cylinder head 25 has individual recesses 26 that cooperate with the cylinder bores 14 and pistons 15 to define the engine combustion chambers.

Intake valves 27 are slidably supported in the cylinder head 25 and control intake ports 28 that cooperate with the inner ends of intake passages 29 formed in the cylinder head 25. The outer ends of the intake passages 29 terminate at an intake manifold 31, which delivers a supply of atmosphere air and fuel from an induction and charge former 32 to the combustion chambers 26. The induction and charge former 32 mixes a supply of atmospheric air with fuel from a fuel tank (not shown) at a suitable ratio suitable for combustion. The amount of air-fuel charge delivered to the combustion chambers 26 by the induction and charge former 32 is regulated by a throttle valve (not shown).

An overhead intake camshaft 33 is rotatably journaled about a first axis, namely its own longitudinal axis, within the cylinder head 25 and includes lobe portions 34 for operating the intake valves 27 through tappets 35. The intake camshaft 33 is driven in a manner which will be described in detail later.

Exhaust valves 36 are slidably supported in the cylinder head 25 and control the flow of exhaust gases from the combustion chambers 26 through exhaust ports 37 and into exhaust passages 38. The exhaust passages 38 cooperate with an exhaust manifold 39 and exhaust system (not shown) for discharging the exhaust gases from the engine 11 to the atmosphere and for silencing these discharged gases. The exhaust valves 36 are operated on by the lobes 41 of an overhead exhaust camshaft 42 through tappets 43. The exhaust camshaft 42 is journaled about an axis that is parallel to the first axis within the cylinder head 25 and driven in a manner to be described in detail later.

The crankshaft 19 will now be described with additional reference to FIG. 2. The crankshaft 19 is rotatably journaled within the crankcase 20 and rotates about a second axis, namely, its own longitudinal axis. This rotation drives a flywheel (not shown) that is affixed to the rear end of the crankshaft 19 and whose inertia assists in the smooth operation of the engine at low engine speeds. This end of the engine is referred to as the "rear end" even though the engine 11 is disposed transversely in the illustrated embodiment. In a longitudinal arrangement this end would normally be the rear end. The flywheel is also associated with a transmission (not shown) for driving a vehicle powered by the engine 11.

A crankshaft damper 44 is affixed to the front end of the crankshaft 19 by a bolt 45 and reduces the torsional vibrations of the crankshaft 19 about the first axis. These vibrations are caused by the downward motions of the pistons 15 and connecting rods 17 during the expansion strokes for the respective cylinder bores 14.

The crankshaft 19 is provided with five throws 18 which cooperate with the respective cylinder bores 14. The throws 18 are connected to the central shaft 46 of the crankshaft 19 by cheek portions 47 which are associated in pairs with each of the throws 18. The throws 18 are offset from the longitudinal axis of the crankshaft 19, and thus their associated pistons 15 and connecting rods 17 exert outwardly directed forces at each of their associated central shafts 46 when the crankshaft 19 is rotating. These forces are balanced by counterweights that are indicated by the reference numeral 48 and are formed on the ends of the cheeks 43 opposite of the ends to which the throws 18 are affixed.

It should be noted, however, that no counterweights 48 are associated with the cheeks of the second cylinder bore 14 from the flywheel, and that only a single counterweight 48 is associated with the cheeks 47 of the cylinder bore 14 that is adjacent to the damper 85. Thus, the crankshaft 19 is not completely balanced.

It is well known in the art that additional balancing means are also necessary in order to adequately balance engines that have a certain number of cylinders, such as three or five cylinders. A balancer shaft is frequently employed as the balancing means and is usually positioned underneath the crankshaft and inside the crankcase member. This location for the balancer shaft, however, increases the overall height of the engine and may cause packaging problems for the vehicle which is driven by the engine. It is desirable therefore to utilize a balancer shaft arrangement where the balancer shaft is positioned in a manner that does not increase the height of the engine while still providing an overall compact assembly. This is accomplished by disposing the balancer shaft forwardly of the engine.

Figure 2:
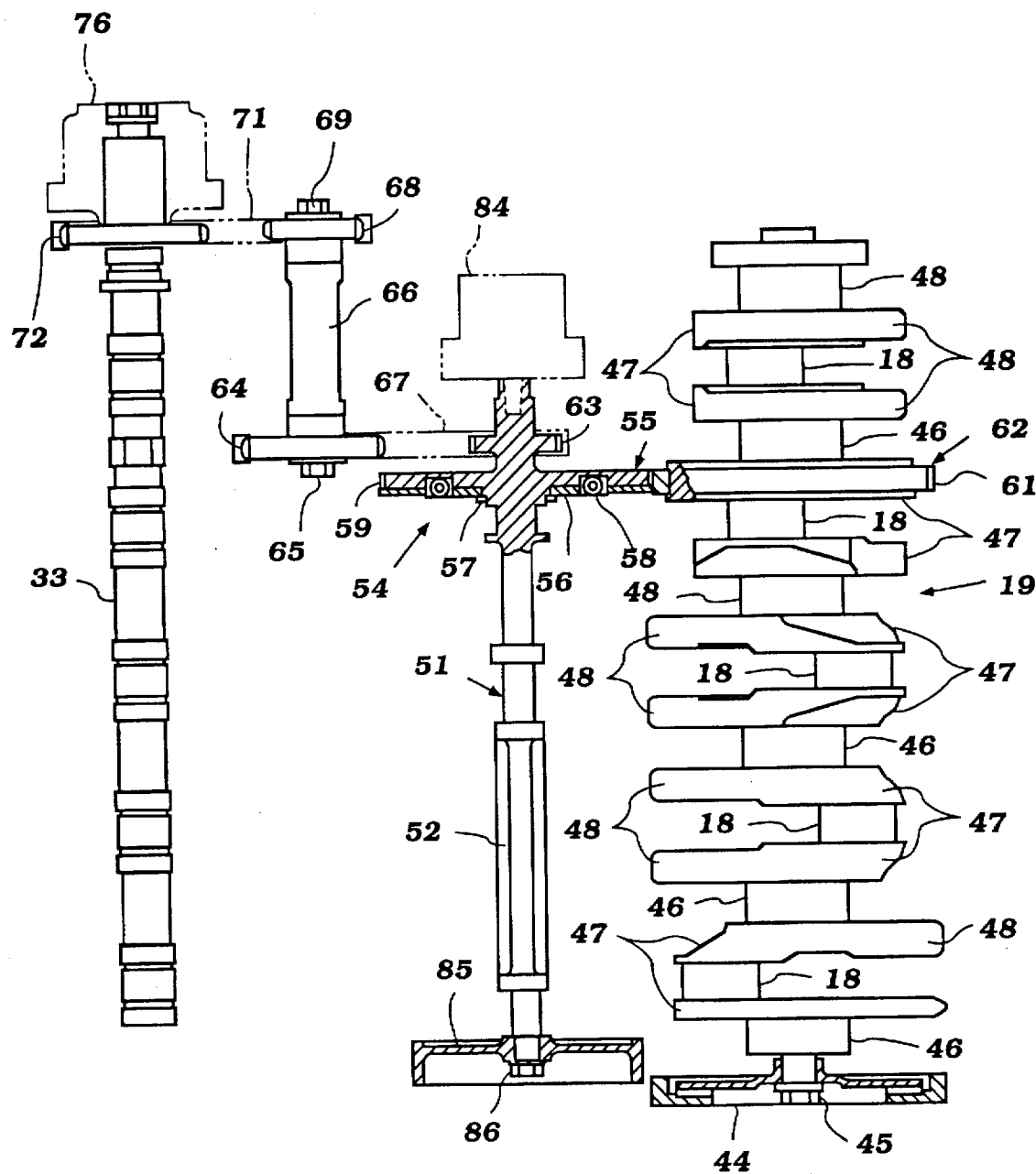
FIG. 2 is a development view of the cam shaft drive means with portions of the crankshaft and intermediate shaft shown in cross section.

With continued reference to FIGS. 1 and 2, an intermediate shaft is utilized as a balancer shaft and indicated by the reference numeral 51. This shaft 51 is rotatably journaled about a third axis, namely, its longitudinal axis, within the engine cylinder block 12. This third axis is parallel to and offset forwardly and upwardly from the second axis of the crankshaft 19 and, along with the second axis, defines a plane that is disposed forwardly of and at some acute angle to the plane defined by the cylinder bores 14.

The balancer shaft 51 includes a front end eccentric balancing mass 52 which serves as the means by which any engine vibration that is not balanced by the counterweights 48 is balanced. The operation of the eccentric mass 52 will be discussed later.

The balancer shaft 51 is driven from the crankshaft 19 by means of a direct gear drive arrangement 54 and includes a gear assembly 55 that is integrally formed with the balancer 51. A sub-gear 56 is held in association with the gear 55 by a retainer 57 and has limited relative rotation to the gear 55 about the third axis. This rotation is controlled by biasing springs 58 which act between the gear 55 and sub-gear 56, both of which are additionally provided with teeth 59 in one-to-one correspondence which extend about their outer circumference. The springs 58 tend to rotate the sub-gear 56 such that its teeth 59 can shift in alignment with those of the gear 55 to take up any lash in the direct gear drive 54. As will be seen below, this misalignment acts as an anti-backlash coupling which improves and silences the operation of the balancer 51.

The teeth 59 of the balancer gear assembly 55 mesh with and are driven by the teeth 61 of a crankshaft drive gear 62 that comprises one of the cheeks 47 of the crankshaft 19 that is associated with the throw 18 of the second cylinder bore 14 and thus spaced inwardly from the ends of the crankshaft 19.

It has been noted that this throw 18 has no counterweights. The gear 55, however, has a cutout portion (not shown) so that it too is unbalanced. This unbalanced mass thus balances for the unbalance of the driving throw 18 of the crankshaft 19. Thus, with additional reference now to FIG. 3, the crankshaft 19 which rotates counterclockwise, as indicated by the arrow a, drives the balancer shaft 51 in the clockwise direction indicated by the arrow b. This clockwise rotation of the balancer 51 causes the eccentric mass 52 to generate forces that are equal to the remaining unbalanced forces generated by the crankshaft 19, but act in the opposite direction. These forces thus cancel each other out, meaning that the balancer shaft 51 effectively balances the engine 11.

With conventional engines it is the practice to utilize the crankshaft to drive the camshafts which are typically driven off of one end of the engine, and thus tend to increase the overall length of the engine. This increase in length is especially undesirable for those associated motor vehicles in which the engine is mounted transversely across the vehicle. It is desirable therefore to utilize an engine configuration where the camshafts are driven by a means associated with the engine that in no way adds to the length of the engine. This invention accomplishes this by additionally utilizing the balancer shaft 51 to drive the camshafts in a manner that does not increase the longitudinal length of the engine.

With reference to FIG. 2, the balancer shaft 51 includes a camshaft drive sprocket 63 that is integrally formed with the balancer shaft 51 adjacent to the balancer gear 54 and is thus disposed inwardly relative to the ends of the crankshaft 19. The chive sprocket 63 drives a further sprocket 64 that is affixed by a bolt 65 and key arrangement (not shown) to one end of a cam driving shaft 66 through a first flexible transmitter drive 67. The cam driving shaft 66 is rotatably journaled at one side of the cylinder block 12 within the cylinder head 25 forward of the cylinder block 12 and about a fourth axis, namely its own longitudinal axis that is parallel to the first, second and third axes.

A further sprocket 68 is affixed by a bolt 69 to the other end of the cam driving shaft 66 and drives a second flexible transmitter device 71, which in turn drives sprockets 72 and 73 that are associated with the overhead camshafts 33 and 42, respectively. Thus, the overhead camshafts 33 and 42 are driven by a camshaft drive arrangement that is disposed entirely forwardly of the engine 12 in a compact manner between the ends of the engine 11 that does not add to the length of the engine 11. This arrangement is covered by covers 74 and 75, which are affixed by any suitable means to the engine block 12 and cylinder head 25, respectively.

It should be noted at this time that the camshaft sprockets 72 and 73 drive the camshafts 33 and 42 through a variable valve timing mechanism 76, shown in phantom in FIG. 2. This variable valve timing mechanism 76 allows the cam timing to be modified so as to provide optimum engine performance under a variety of engine running conditions.

As is well known, the camshafts 33 and 42 are normally driven at one half crankshaft speed. Usually this is accomplished by means of a two-to-one gear or sprocket reduction between the crankshaft 19 and the camshafts 33 and 42. Such large reductions in a single drive tend to cause the gears and/or sprockets associated with the camshafts to be unduly large. In accordance with a feature of this invention, a portion of the speed reduction occurs between the sprockets 63 and 64 and the remainder of the reduction between the sprockets 68 and 72 and 73 on the camshafts 33 and 42 such that the two combined ratios give the desired one-half speed reduction. It will also be noted that the two flexible transmitters 67 and 71 lie outside of the area bounded by the cylinder bores 14 in end view (FIG. 1). This permits these drives to be placed inwardly from the outer ends of the engine 11.

Figure 3:
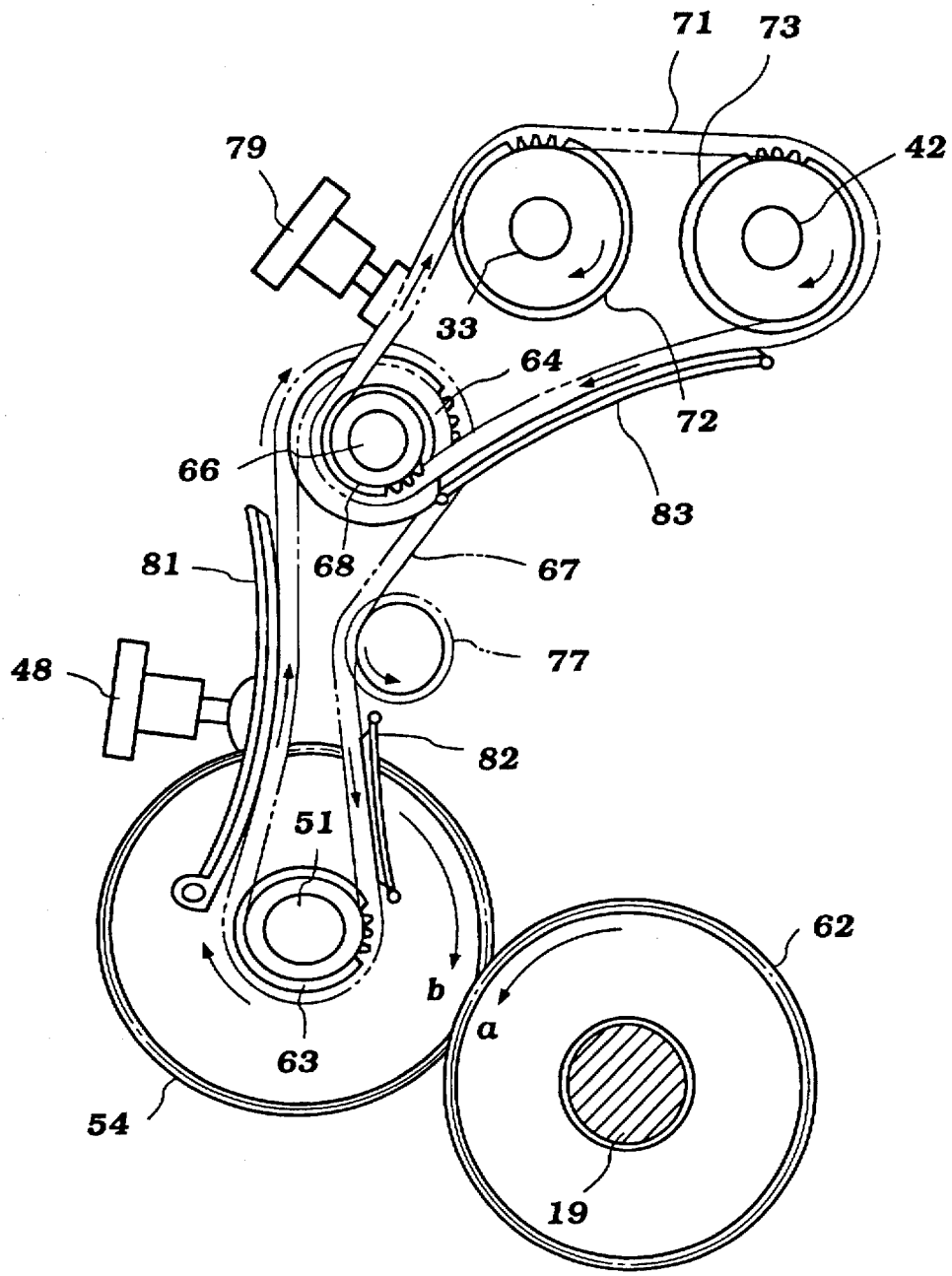
FIG. 3 is a end elevational view of the cam shaft drive arrangement.

In addition to driving the cam driving shaft 66, the first flexible transmitter drive 67 also drives a water pump 77 which pumps water to the water jackets 16 and is affixed to the front of the engine above the plane defined by the first and second axes and forward of the plane defined by the cylinder bores 14 and in engagement with the outer peripheral surface of the first flexible transmitter drive 67, as is seen in FIG. 3.

It is also seen in FIG. 3 that a pair of adjustable, flexible transmitter tensioners 78 and 79 are associated with the first and second flexible transmitter drives 67 and 71, respectively on the side away from the cylinder block 12. The first tensioner 78 is associated with the first flexible transmitter drive 67 and operates a tension rail 81 that is pivotally connected at one end to the engine block 12 on the outside of the transmitter drive 67 opposite of the water pump 77. A guide rail 82 is also associated with the transmitter drive 67 adjacent to the water pump 77.

The second tensioner 79 acts directly against the outer front periphery of the second flexible transmitter drive 71 above the cam driving shaft 66. A guide rail 83 is also associated with the second flexible transmitter drive 71. Thus, the above tensioners 78 and 79 are both disposed forwardly of their associated flexible transmitter drives 67 and 71 and are readily accessible for adjustment if needed by removing the covers 74 and 75.

The balancer shaft 51 is also used to drive a plurality of additional engine and other accessories. A power steering pump is indicated by the reference numeral 84 and is directly driven off of the rearward end of the balancer shaft 51. A second accessory chive mechanism is composed of the pulley 85 that is affixed to the forward end of the balancer shaft 51 by a bolt 86. The pulley 85 drives a serpentine belt 87 which transmits drive to a number of pulleys associated with various engine and other accessories.

An alternator 88 is affixed to the lower front face of the engine block 12, forward of the plane defined by the cylinder bores 14 and above the plane defined by the second and third axes, and driven off of the belt 87, as is an air compressor 89 that is affixed to the lower forward portion of the crankcase member 21 beneath the plane defined by the second and third axes. An idler pulley 91 is associated with the belt 87 above the air compressor 89 and utilized to provide clearance for the belt 87 from the engine 11. A tension pulley 92 is also affixed to the engine 11 between the air compressor 89 and idler 91, and maintains proper torsion in the belt 87.

Figure 4:
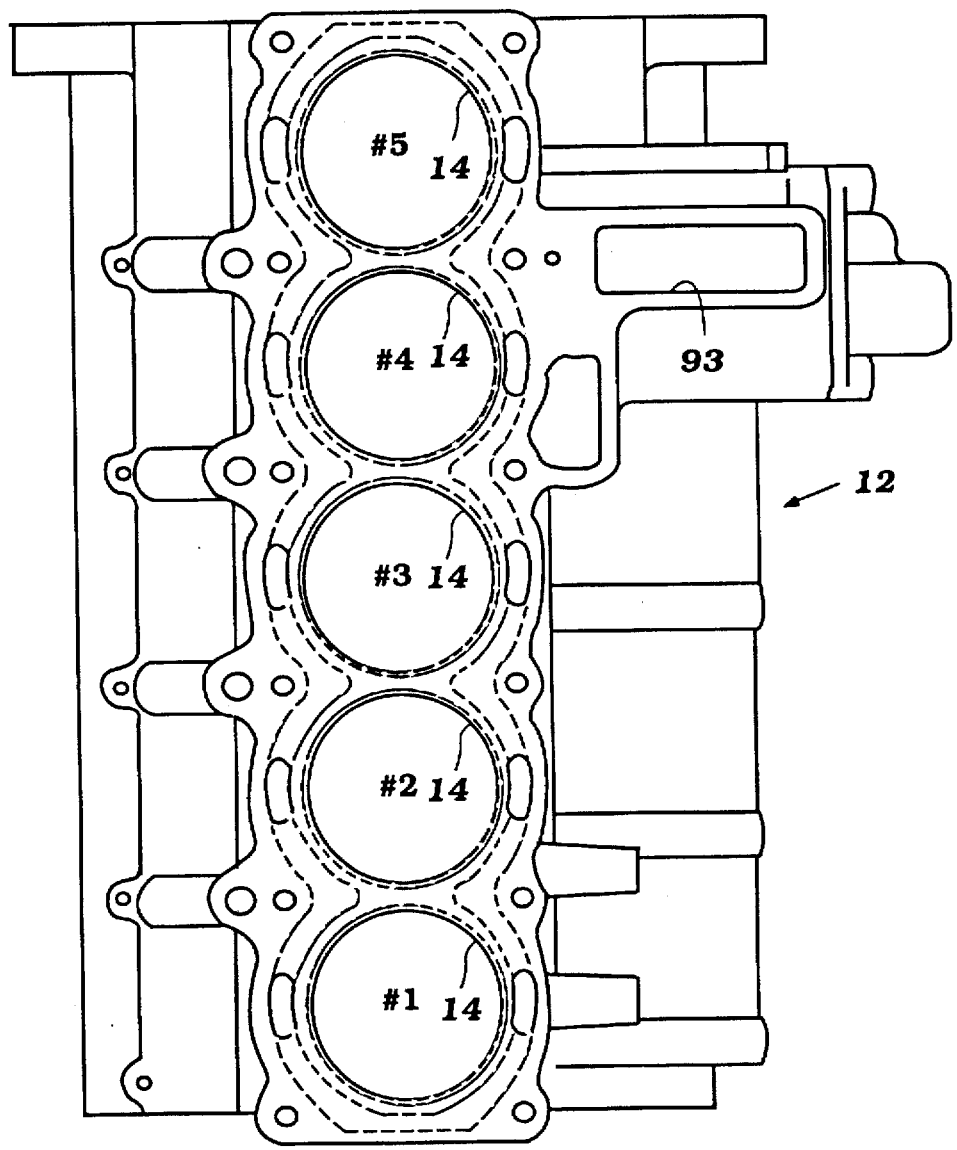
FIG. 4 is a top plan view of a cylinder block which utilizes the drive arrangement of FIGS. 1–3 with the associated components removed.

FIG. 4 is a top plan view of the engine block 12 used in association with the drive arrangement 54. A vertical tunnel 93 is disposed forwardly of and spaced between the numbers four and five cylinder bores 14 which are at the rear or flywheel end of the engine 11. The tunnel 93 is in alignment with the camshaft drive sprocket 63 of the intermediate shaft 51 and the first flexible transmitter drive 67 extends through the tunnel 93 for driving the cam driving shaft 66.

Figure 5:
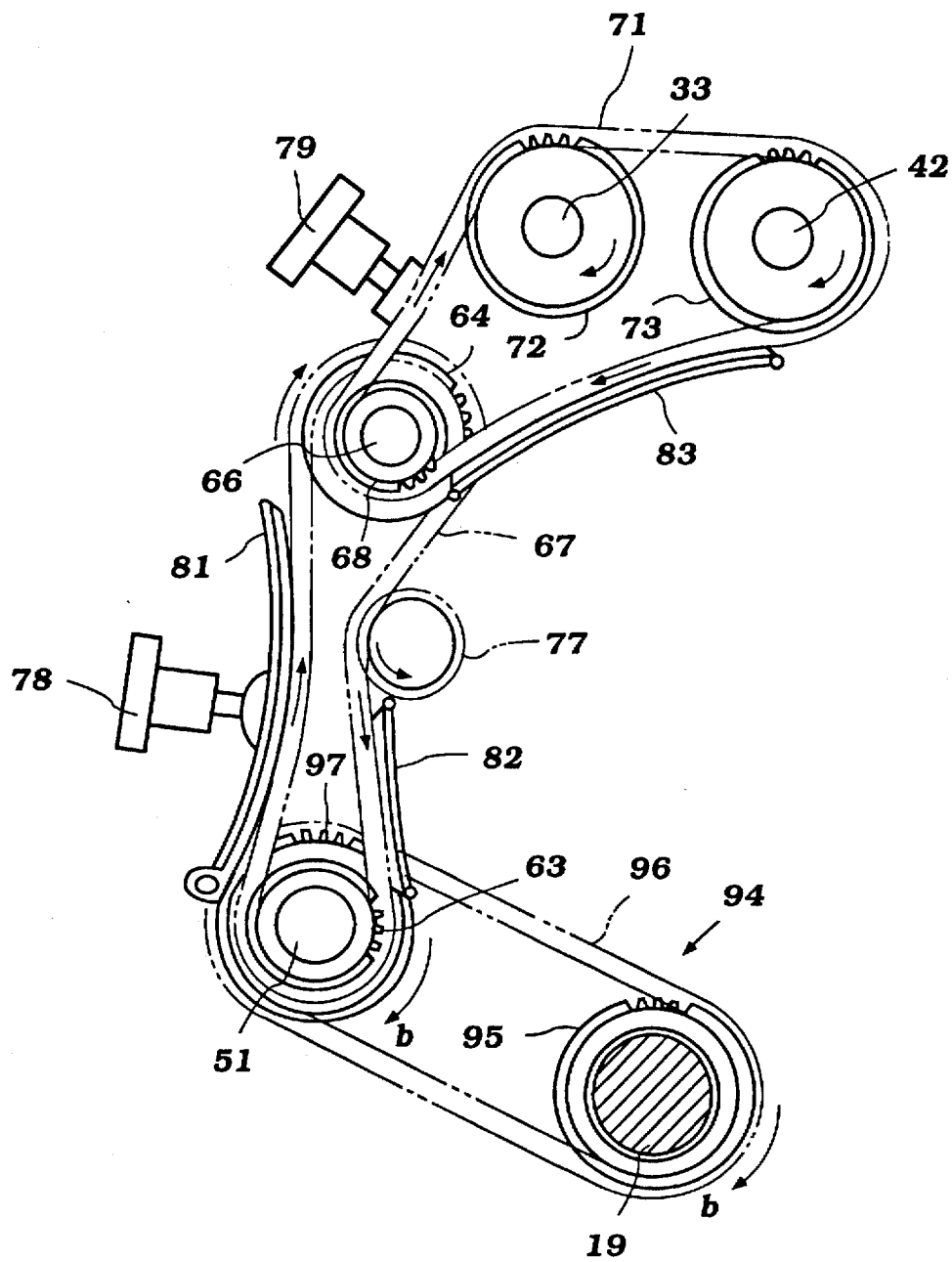
FIG. 5 is a side elevational view, in part similar to FIG. 3, and shows a further embodiment of cam shaft drive arrangement.

In the embodiment thus far described the intermediate or balancer shaft 51 was driven from the crankshaft 19 through a gear drive. Although that used incorporates a backlash take up device, gear noise still may result. FIG. 5 shows another embodiment for further reducing the potential of noise.

FIG. 5 illustrates an intermediate shaft driving arrangement utilized by an engine 11 whose crankshaft 19 rotates clockwise as indicated by the lower arrow b. A flexible transmitter, chain drive system 94 is utilized as the means by which the intermediate shaft 51 is driven off of the crankshaft 19. This drive includes an intermediate shaft driving sprocket 95 which is affixed to the crankshaft 19. The sprocket 95 drives a third flexible transmitter drive 96 which, in turn, drives an intermediate shaft sprocket 97 that is affixed to the intermediate shaft 51 by any suitable means. Thus, the intermediate shaft 51 is driven in the clockwise direction indicated by the upper arrow b for driving the camshafts 33 and 42 in the manner previously described. In all other regards this embodiment is the same as that already described. For that reason further description of this embodiment is not believed necessary to permit those skilled in the art to practice this embodiment It should be readily apparent that the above camshaft drive arrangements disclosed provides for a compact assembly that in no way adds to the length of the engine and a tensioner arrangement that is easily accessible for adjustment. Of course, the foregoing description is that of preferred embodiments of the invention, and various changes and modifications may be made without departing from the spirit and scope of the invention, as defined by the appended claims.

What is claimed is:

1. An internal combustion engine comprised of a cylinder block, a cylinder head closing one end of said cylinder block, at least one overhead cam shaft journaled for rotation about a first axis in said cylinder head for operating valves therein, a crankcase closing the other end of said cylinder block and containing a crankshaft rotatably journaled about a second axis parallel to said first axis, an intermediate shaft journaled for rotation about a third axis parallel to said first and said second axes and disposed on one side of said cylinder block, a drive arrangement for driving said intermediate shaft from said crankshaft, a cam driving shaft journaled for rotation at said one side of said cylinder block about a fourth axis parallel to said first, second, and third axes and spaced from said third axis and in proximity to said cylinder head, a first flexible transmitter for driving said cam driving shaft from said intermediate shaft, a second flexible transmitter for driving said cam shaft from said cam driving shaft, and at least one flexible transmitter tensioner engaged with one of said flexible transmitters on the side thereof spaced from said cylinder block.

2. An internal combustion engine as set forth in claim 1, wherein the intermediate shaft is driven by the crankshaft at a point intermediate the ends of the crankshaft.

3. An internal combustion engine as set forth in claim 2, further including a second flexible transmitter tensioner engaged with the other of the flexible transmitters for maintaining the tension therein.

4. An internal combustion engine as set forth in claim 3, wherein the second flexible transmitter tensioner is also disposed to engage the side of the other flexible transmitter spaced from the cylinder block.

5. An internal combustion engine as set forth in claim 4, wherein there are a pair of overhead cam shafts rotatably journaled about parallel axes by the cylinder head and each driven by the second flexible transmitter.

6. An internal combustion engine as set forth in claim 1, wherein the flexible transmitters are disposed so that they all lie outside of the area bounded by cylinder bores formed in the cylinder block.

7. An internal combustion engine as set forth in claim 1, wherein a plurality of aligned cylinder bores are formed in the cylinder block and wherein the crankshaft has a plurality of throws each associated with a respective piston in a respective one of said cylinder bores.

8. An internal combustion engine as set forth in claim 2, wherein the intermediate shaft is driven from the crankshaft at a point between two of the cylinder bores and spaced inwardly from the ends of the crankshaft.

9. An internal combustion engine as set forth in claim 8, further including a balancing mass formed on the intermediate shaft.

10. An internal combustion engine as set forth in claim 9 wherein the balancing mass is formed on only one end of the intermediate shaft.

11. An internal combustion engine as set forth in claim 10, further including means for driving an engine accessory is disposed at one end of the intermediate shaft.

12. An internal combustion engine as set forth in claim 11, wherein the means for driving the engine accessory is disposed at the end of the intermediate shaft opposite to that where the balancer mass is.

13. An internal combustion engine as set forth in claim 12, further including means for driving an additional accessory directly from the intermediate shaft at the other end of the intermediate shaft.

* * * * *